United States Patent [19]
Van Niekerk

[11] Patent Number: 5,133,448
[45] Date of Patent: Jul. 28, 1992

[54] TEAR DETECTOR FOR CONVEYOR BELT

[75] Inventor: Louis L. Van Niekerk, Middelburg, South Africa

[73] Assignee: Inpro Marketing CC, Middelburg, South Africa

[21] Appl. No.: 581,377

[22] Filed: Sep. 12, 1990

[51] Int. Cl.⁵ .............................................. B65G 43/00
[52] U.S. Cl. .................................. 198/502.1; 198/810
[58] Field of Search .................... 198/810, 502.2, 572, 198/502.1

[56] References Cited

U.S. PATENT DOCUMENTS

| | | | |
|---|---|---|---|
| 3,245,520 | 4/1966 | Basolo et al. | 198/810 |
| 3,509,986 | 5/1970 | Focke | 198/572 X |
| 3,597,756 | 8/1971 | Jackson | 198/810 X |
| 3,913,729 | 10/1975 | Andrews | 198/810 X |
| 3,963,115 | 6/1976 | Teske et al. | 198/810 X |

FOREIGN PATENT DOCUMENTS

| | | | |
|---|---|---|---|
| 697995 | 8/1970 | South Africa . | |
| 0207108 | 10/1968 | U.S.S.R. | 198/810 |
| 0859264 | 8/1981 | U.S.S.R. | 198/810 |

Primary Examiner—D. Glenn Dayoan
Attorney, Agent, or Firm—Fish & Richardson

[57] ABSTRACT

Apparatus 13 and a method of detecting a tear in a conveyor belt 10 are disclosed and claimed. The apparatus includes two pivotable arms 14 biased against the sides of the belt. Each arm is connected to a variable resistor 18, 19 connected into an electronic circuit. When there is a tear in the belt, the arm will pivot inwardly causing the resistance of its associated resistor to change. This change is processed by the circuit to generate a signal which may be used to interrupt electric power to an electric motor driving the belt.

8 Claims, 2 Drawing Sheets

TEAR DETECTOR FOR CONVEYOR BELT

BACKGROUND OF THE INVENTION

This invention relates to conveyor belts and more particularly to tear detectors for conveyor belts.

Applicant is aware of a number oa available detectors adapted to detect a tear in a conveyor belts. One such a detector comprises a plurality of tranversely extending electric conductors mounted in or on the belt, spaced along its length. At regular intervals in time, the detector applies an electric potential difference to each of these conductors and simultaneously monitors current flow through these conductors. In the event of a longitudinal tear in the belt, one or more of these conductors will normally be severed so that no current flow will be detected. One disadvantage of this kind of apparatus is that it can only detect longitudinally extending tears. Furthermore, a more severe disadvantage of this kind of apparatus is that it is very expensive to equip each belt with a suitable configuration of electric conductors for tear detection.

OBJECTS OF THE INVENTION

Accordingly it is an object of the present invention to provide an alternative detector and method of detection with which the applicant believes at least some of the disadvantage of the presently known apparati and methods will be alleviated.

According to the invention a method of detecting a tear in a conveyor belt comprises the steps of monitoring the width of the belt, detectig a change in the width of the belt and generating an electric signal when a changed in the width of the belt is detected.

The aforementioned signal may be used to stop the belt by interruping electric power to an electric motor driving the belt.

The width of the belt may be monitored in any suitable manner. So, for example, may laser beams be used.

However, in a presently preferred embodiment, the width is monitored by detecting changes in the position of an arm biased against a side of the belt. The change in position may be detected by detecting changes in the resistance of a variable resistor connected to the arm.

According to another aspect of the invention apparatus for detecting a tear in a conveyor belt comprises:
  means for monitoring the width of the belt comprising means sensitive to a change in the width of the belt; and
  means responsive to the sensitive means for generating an electric signal when a change in the width of the belt is detected.

The means sensitive to a change in the width of the belt may comprise one or more pivotable arms which in use, are biased to abut against a side of the belt.

The arm may be connected to the responsive means in the form of a variable resistor to change the resistance of the resistor when the arm pivots as a result of a change in the width of the belt.

In the most preferred form of this embodiment of the detector, two spaced arms are provided; the arms being pivotably mounted on a support and biased towards one another to abut against opposed sides of a belt running between them.

The means for generating an electric signal may further comprise electronic circuitry adapted to detect the change in resistance of the said variable resistor and to generate a signal in response to the change.

The circuitry may also include a relay connectable into a circuit to interrupt that circuit when the aforementioned signal is generated.

BRIEF DESCRIPTION OF THE DRAWINGS

The invention will now further be described, by way of example only, with reference to the accompanying diagrams wherein.

DETAILED DESCRIPTION OF PREFERRED EMBODIMENTS

Figure 1:
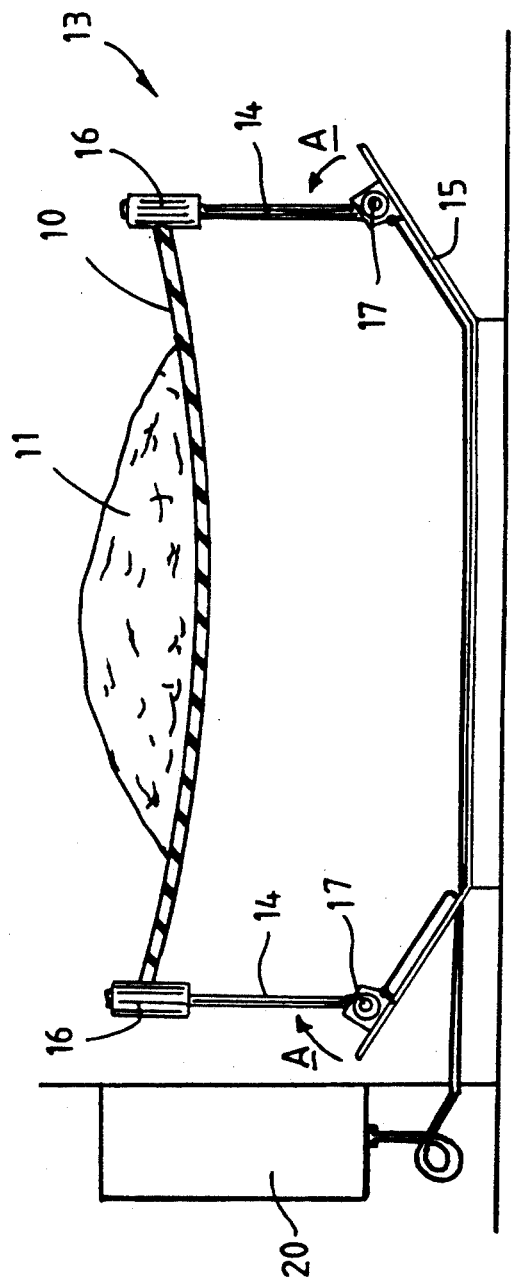
FIG. 1: is a transverse section through a conveyor belt in use, also showing apparatus according to the invention for detecting tears in the belt.

In FIG. 1 there is shown a transverse section through a conveyor belt 10 carrying a load 11. The belt is mounted on a support and drive assembly (not shown) including an electric motor 30 (shown in FIG. 2) for driving the belt in FIG. 1 in use, to move into and out of the page.

A tear detector according to the invention is generally designated by the reference numeral 13 in FIG. 1. the detector comprises means for monitoring the width of the belt comprising means sensitive to a change in the width of the belt in the form of two spring biased arms 14. Arms 14, which are pivotably mounted on a bed 15, are biased in the direction of arrows A. Nylon rollers 16 are rotatably mounted towards the free ends of arms 14 to abut against the sides of belt 10.

Figure 2:
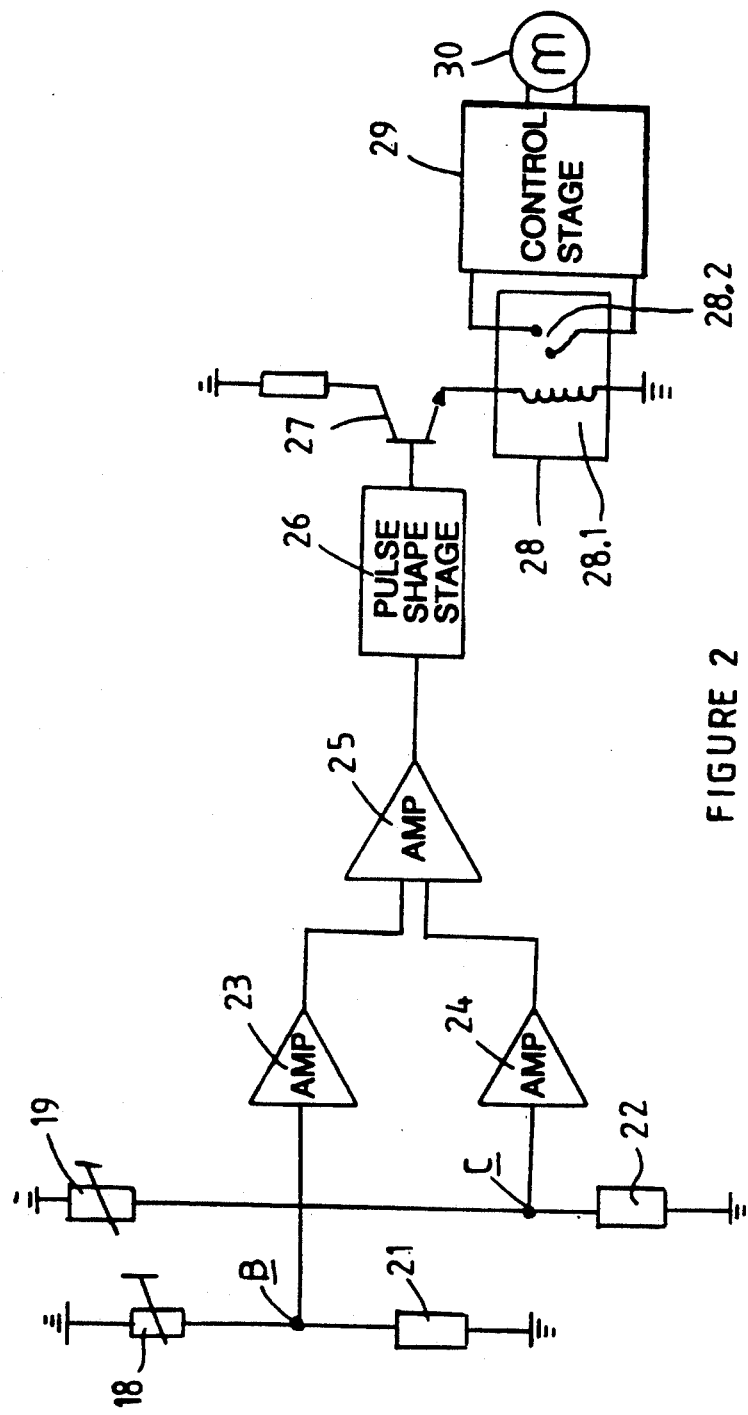
FIG. 2: is a block diagram of the electronic circuitry of the tear detector according to the invention.

Each of rotatable shafts 17 on which arms 14 are rigidly mounted is connected to an adjustment shaft (not shown) of variable resistors 18 and 19 shown in FIG. 2. Resistors 18 and 19 and the remainder of the electronic circuitry, which will be described hereinbelow, are located in housing 20 in FIG. 1.

Referring now to FIG. 2, variable resistors 18 and 19, each of which is associated with an arm 14 of the detector 13, are connected in voltage divider networks to ground via resistors 21 and 22, respectively. Point B in die divider network of variable resistor 18 is connected to an input of amplifier 23, while point C in the other divider network is connected to an input of amplifier 24.

The outputs of the aforementioned amplifiers are connected to the inputs of a dual input amplifier 25. This amplifier 25 is preset and biased to provide a zero output when changes in the values of resistors 18 and 19 are equal and of opposite polarity.

The output of amplifier 25 is connected to a pulse shape stage 26. This stage is adapted to provide a pulse to trigger driver transistor 27 when changes in the values of resistors 18 and 19 are not equal. This stage may also have a hysteresis characteristic adjustable to recognise and overlook known changes in the aforementioned values associated with known and/or acceptable wear of the belt.

The coil 28.1 of a relay 28 is connected in the emitter circuit of transistor 27. The contacts 28.2 of relay 28 are connected in a circuit 29 which is connected to a control stage adapted to interrupt electric power to the aforementioned motor 30 driving the belt 10.

The detector 13 according to the invention monitors the width of the belt 10 in order to detect tears in the belt.

In the event of a tear developing in the belt, the width of the belt will decrease. One of the arms will then, under the influence of the spring, pivot in the direction of arrow A causing its associated shaft 17 to rotate.

Rotating shaft 17 will cause the value of either resistor 18 or 19 to change. This change results in a signal at the output of amplifier 25. This signal is then shaped into a suitable pulse to trigger transistor 27.

When transistor 27 is on, current flows through coil 28.1 to energise it. Energised coil 28.1 causes normally closed contacts 28.2 to open, thereby to interrupt power to the motor 30 driving the belt 10.

Damaged belt 10 may now be repaired or replaced by a new one.

In the event of mere movement of the belt in a lateral direction, any change in the values of resistors 18 and 19 will be equal and of opposite polarity. Such changes will not result in a signal at the output of amplifier 25 so that the belt will be stopped.

It will be appreciated that there are many variations in detail possible on the detector and method of detection according to the invention without departing from the scope and spirit of the appended claims.

I claim:

1. A method of detecting a tear in a conveyor belt having a circumference or length dimension, a thickness dimension and a width dimension between two opposite lateral sides thereof, the method comprising the steps of:
    monitoring, in use and in situ, the width dimension of the belt,
    detecting any change in the width of the belt by detecting a change in the position of a pivotable arm biased against a lateral side of the belt, and
    generating a signal when a change in the width of the belt is detected.

2. A method as claimed in claim 1 comprising the steps of biasing a pivotal arm against each of the opposite lateral sides of the belt and distinguishing between equal changes in a similar direction in the positions of the arms on the one hand and other changes in the positions of the arms, on the other hand, thereby to distinguish between lateral movement of the belt on the one hand and changes in the width of the belt on the other.

3. A method as claimed in any one of claims 1 or 11 wherein the signal is utilized to interrupt electric power supplied to an electric motor driving the belt.

4. Apparatus for detecting a tear in a conveyor belt having a length dimension or circumference, a thickness dimension and width dimension between two opposite lateral sides of the belt, the apparatus comprising:
    two spaced arms mounted on a support;
    means for, in use, biasing the arms in opposite directions and against the opposite lateral sides of the belt; and
    means responsive to a change in the position of at least one of the arms for generating an electric signal when a change in the position of the arm and thus the width of the belt is detected.

5. Apparatus as claimed in claim 4 wherein the arms are pivotably mounted on the support.

6. Apparatus as claimed in claim 4 wherein the responsive means comprises a variable resistor connected to each arm so that the resistance of the resistor is changed when the position of the arms changes.

7. Apparatus as claimed in claim 6 wherein the resistors are connected to inputs of electronic circuitry adapted to detect simultaneous and equal changes in a similar direction in the positions of both the arms and thus lateral movement of the belt.

8. Apparatus as claimed in claim 6 or claim 7 wherein the variable resistors are connected into an electronic circuit adapted to generate a signal when a change in the width of the belt is detected and to interrupt electric power to an electric motor driving the belt.

* * * * *